(12) United States Patent
Kewitsch

(10) Patent No.: US 11,705,707 B2
(45) Date of Patent: Jul. 18, 2023

(54) AUTOMATED INSTALLATION AND RECONFIGURATION OF FIBER OPTIC AND COPPER CABLES IN LARGE SCALE DATA CENTERS

(71) Applicant: TELESCENT INC., Irvine, CA (US)

(72) Inventor: Anthony Stephen Kewitsch, Santa Monica, CA (US)

(73) Assignee: TELESCENT INC., Irvine, CA (US)

( * ) Notice: Subject to any disclaimer, the term of this patent is extended or adjusted under 35 U.S.C. 154(b) by 189 days.

(21) Appl. No.: 16/958,704

(22) PCT Filed: Dec. 30, 2017

(86) PCT No.: PCT/US2017/069160
§ 371 (c)(1),
(2) Date: Jun. 27, 2020

(87) PCT Pub. No.: WO2019/133021
PCT Pub. Date: Jul. 4, 2019

(65) Prior Publication Data
US 2020/0358277 A1    Nov. 12, 2020

(51) Int. Cl.
*H02G 3/38* (2006.01)
*G02B 6/48* (2006.01)
*H02G 1/06* (2006.01)

(52) U.S. Cl.
CPC .............. *H02G 3/381* (2013.01); *G02B 6/48* (2013.01); *H02G 1/06* (2013.01)

(58) Field of Classification Search
CPC ............. H02G 3/381; H02G 1/06; G02B 6/48
See application file for complete search history.

(56) References Cited

U.S. PATENT DOCUMENTS 5,551,545 A * 9/1996 Gelfman ................ H02G 11/02
                                                    191/12.2 A
6,584,267 B1   6/2003 Caveney et al.
(Continued)

FOREIGN PATENT DOCUMENTS

AU     2010262903 A1 * 12/2010
CN     103427371    * 12/2013
(Continued)

OTHER PUBLICATIONS

Legrand PW cable tray systems catalog Jun. 23, 2016, https://catalogos-web.s3.amazonaws.com/PW-2017-2018.pdf (Year: 2016).*
(Continued)

*Primary Examiner* — Terrell L McKinnon
*Assistant Examiner* — Ding Y Tan
(74) *Attorney, Agent, or Firm* — Siritzky Law, PLLC

(57) ABSTRACT

Apparatus and methods are employed to install fiber optic cables in a data center facility using one or more cable dispensing robots that dispense fiber optic cable that is pre-spooled on a cable cartridge, by programmatically unspooling the cable from the cable cartridge and paying the cable out along a potentially transverse oscillatory path (e.g. sinusoidal curve) as the robot moves down a cable tray network that is arranged adjacent and above large numbers of equipment bays. A controller accesses a database which stores the state of the cables within the cable tray network. The database further stores information regarding availability of cable cartridges of standard cable lengths, which are potentially stored within a cable cassette loading/unloading system. The controller receives instructions on where and how to spatially deploy a fiber optic interconnect cable within the tray network of the data center facility.

21 Claims, 19 Drawing Sheets

(56) References Cited

U.S. PATENT DOCUMENTS

| | | | |
|---|---|---|---|
| 6,603,907 B2 | 8/2003 | Stark | |
| 7,289,197 B2 | 10/2007 | Kewitsch | |
| 7,315,681 B2 | 1/2008 | Kewitsch | |
| 7,331,436 B1* | 2/2008 | Pack | F41H 7/005 |
| | | | 191/12.2 A |
| 7,460,753 B2 | 12/2008 | Kewitsch | |
| 7,665,901 B2 | 2/2010 | Kewitsch | |
| 7,920,764 B2 | 4/2011 | Kewitsch | |
| 8,068,715 B2* | 11/2011 | Kewitsch | G02B 6/356 |
| | | | 385/17 |
| 8,150,227 B2 | 4/2012 | Kewitsch | |
| 8,428,405 B2 | 4/2013 | Kewitsch | |
| 8,463,091 B2 | 6/2013 | Kewitsch | |
| 8,480,310 B2 | 7/2013 | Kewitsch | |
| 8,488,938 B2 | 7/2013 | Kewitsch et al. | |
| 8,554,033 B2 | 10/2013 | Kewitsch | |
| 8,805,155 B2 | 8/2014 | Kewitsch | |
| 9,052,465 B2 | 6/2015 | Kewitsch | |
| 9,052,490 B2 | 6/2015 | Kewitsch | |
| 9,110,249 B2 | 8/2015 | Kewitsch | |
| 9,188,748 B2 | 11/2015 | Kewitsch | |
| 9,411,108 B2 | 8/2016 | Kewitsch | |
| 9,575,258 B2* | 2/2017 | Pedut | G02B 6/3574 |
| 9,703,060 B2 | 7/2017 | Kewitsch | |
| 10,042,122 B2 | 8/2018 | Kewitsch | |
| 10,345,526 B2 | 7/2019 | Kewitsch et al. | |
| 10,649,149 B2 | 5/2020 | Kewitsch | |
| 10,895,691 B2 | 1/2021 | Kewitsch | |
| 10,977,458 B2 | 4/2021 | Kewitsch | |
| 2009/0003761 A1* | 1/2009 | Matsuoka | G02B 6/42 |
| | | | 385/14 |
| 2009/0097797 A1* | 4/2009 | Kewitsch | H04Q 11/0005 |
| | | | 385/17 |
| 2010/0278500 A1 | 11/2010 | Campos et al. | |
| 2010/0329621 A1* | 12/2010 | Makrides-Saravanos | |
| | | | G02B 6/4446 |
| | | | 385/135 |
| 2013/0064506 A1* | 3/2013 | Eberle, Jr | G02B 6/32 |
| | | | 385/49 |
| 2015/0331200 A1* | 11/2015 | Pedut | G02B 6/356 |
| | | | 385/17 |
| 2016/0107312 A1* | 4/2016 | Morrill | B25J 9/0093 |
| | | | 700/214 |
| 2016/0140259 A1* | 5/2016 | Ponamgi | H04L 41/0826 |
| | | | 703/1 |
| 2016/0202424 A1* | 7/2016 | Kewitsch | G02B 6/3508 |
| | | | 385/17 |
| 2017/0193134 A1* | 7/2017 | Liu | G06F 30/18 |
| 2019/0293875 A1 | 9/2019 | Kewitsch | |
| 2020/0003978 A1 | 1/2020 | Kewitsch | |
| 2020/0041725 A1 | 2/2020 | Kewitsch | |
| 2020/0358277 A1 | 11/2020 | Kewitsch | |
| 2020/0359117 A1 | 11/2020 | Kewitsch | |
| 2021/0072483 A1 | 3/2021 | Kewitsch et al. | |

FOREIGN PATENT DOCUMENTS

| | | | |
|---|---|---|---|
| CN | 103427371 A | | 12/2013 |
| CN | 203786352 | * | 8/2014 |
| FR | 2650922 A1 | | 2/1991 |
| FR | 2653946 A1 | * | 2/1992 |
| KR | 20140133286 | * | 11/2014 |
| KR | 20140133286 A | | 11/2014 |
| KR | 20150030043 A | | 3/2015 |
| KR | 2015087043 | * | 7/2015 |
| WO | WO-2016099831 | * | 6/2016 |

OTHER PUBLICATIONS

FibreFab Fibre Optic Cable Catalogue, ver7.11, 2011 (Year: 2011).*

EPO, Supplementary Partial European Search Report for European Application No. EP17936770 (dated Aug. 12, 2021) pp. 1-5.

EPO, Provisional Opinion Accompanying the Partial Search Result for European Application No. EP17936770 (dated Aug. 12, 2021) pp. 1-5.

PCT, International Search Report for International Application No. PCT/US2017/069160 (dated Mar. 29, 2018).

PCT, Written Opinion of the International Searching Authority for International Application No. PCT/US2017/069160 (dated Mar. 29, 2018).

PCT, International Preliminary Report on Patentability for International Application No. PCT/US2017/069160 (dated Jun. 30, 2020).

* cited by examiner

AUTOMATED INSTALLATION AND RECONFIGURATION OF FIBER OPTIC AND COPPER CABLES IN LARGE SCALE DATA CENTERS

RELATED APPLICATIONS

This application is a 371 of International application PCT/US2017/069160, filed Dec. 12, 2017, the entire contents of which are hereby fully incorporated herein by reference for all purposes.

TECHNICAL FIELD OF THE INVENTION

The present invention relates to methods and apparatus to automate the installation of fiber optic cables within a data center or telecommunications facility utilizing robotics and cable routing algorithms. The cables are installed by a dispensing robot in a deterministic and optimized configuration within an interlocking cable tray system, with integral track on which the robot is attached, such that localized cable clustering within the tray system is eliminated.

DESCRIPTION OF THE BACKGROUND ART

As data centers scale in complexity to achieve ever-increasing performance, the physical network of high bandwidth links becomes increasingly difficult to install and maintain. Data centers today can have over a hundred thousand physical fiber optic cables connecting most if not all devices (servers, storage, switches, routers). These cables are typically installed within overhead cable trays, or optionally underneath floor tiles in a raised floor facility. The installation of cables is highly labor intensive, and may require multiple technicians on ladders at one time to install cables into elevated cable trays. 100-meter lengths of cable are not uncommon and can take nearly a day to install. As facilities require equipment upgrades every 3 years to manage obsolescence, the volume and weight of cables within the tray system can become excessive, requiring a major overhaul of the fiber-cabling infrastructure. In addition, it is challenging to manage slack cable as it drops down from cable tray to network port, which may be anywhere along the port. The slack is typically stored in a haphazard fashion in the length of cable tray adjacent to the location where cable drops down through a "waterfall" attachment, which prevents excessive bending of optical fiber cables, and cable is routed down the equipment rack or enclosure to the respective network interface. Moreover, records of the path and identify of cables within the cable track are not kept, making future troubleshooting extremely challenging. Therefore, there is a significant need to automate the installation and documentation of fiber optic cables in data centers.

SUMMARY OF THE INVENTION

To address the foregoing need, the subject invention comprises an automated physical cable installation system for data centers, in which interconnected cable trays are provided incorporating an internal track system with a guided cable dispensing or laying robot under computer control. This system fully automates the provisioning, expansion, upgrade and operation of the data centers. The robotic cable dispenser travels within the system of cable trays above the equipment racks in a data center. Preferably, the system utilizes cable dispensing or laying robots, which are preferably battery-powered, that traverse these trays while carrying and laying fiber optic cables within the bases of the trays and under wireless control by a remote server. In the preferred embodiment, fixed length fiber optic and copper links are installed and reconfigured automatically by the system under the direction of an algorithm that deploys cables in a fashion that eliminates or minimizes localized cable clustering within the trays. Routing algorithms utilize a set of standard length cables (10 m, 25 m, 50 m, 100 m) to optimally lay fibers within the trays, laying down fibers with a potentially oscillatory path to retain and distribute slack within the trays. The determination and distribution of slack by a server helps to prevent excess bulk of cable at any one location, which would otherwise prevent the further laying of cable within the shared trays. One or more cable dispensing robots lay out cables as needed to establish physical network links between pairs of devices. This system reduces the labor required to install and operate data centers and eliminates errors associated with fiber optic cable bend radius management, labeling and documentation. The use of automation further enables the use of reduced diameter optical fiber cabling without bulky strength members and jacketing, which allows the density of fibers with a given cable tray volume to increase by potentially a factor of ten.

DETAILED DESCRIPTION OF THE INVENTION

The present invention comprises a large scale, automated physical cabling system for data centers to reduce the labor required to install and operate data centers and to eliminate errors associated with fiber optic cable bend radius management, labeling and documentation. The invention further enables the use of reduced diameter optical fiber cabling without bulky strength members and jacketing, which allows the density of fibers with a given cable tray volume to increase by a factor of ten. This translates directly to increased network bandwidth and compute capacity within a data center of a given size. The cables are installed along pre-calculated paths, such that excess cable lengths are distributed optimally along the cable tray system based on factors including the local volume of pre-existing cables within the cable trays.

Figure 1:
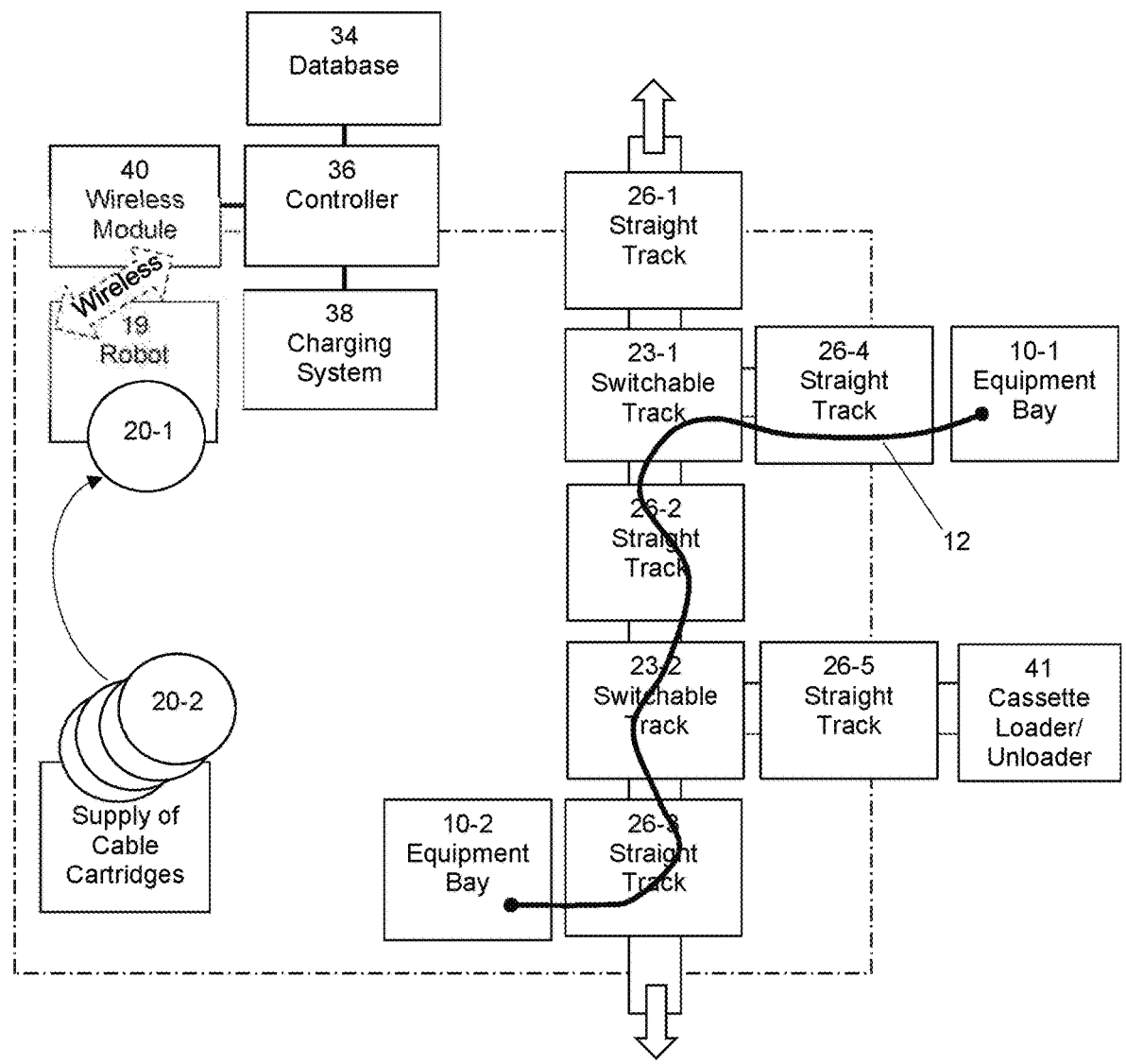
FIG. 1 is a block diagram of the elements comprising an automated cable installation system configured in accordance with a preferred embodiment of the present invention.

A block diagram of this automated and computer controlled cable deployment system constructed in accordance with a preferred embodiment of the invention is illustrated in FIG. 1. This system consists of one or more motorized, self-powered cable dispensing robots or shuttles 19 that dispense fiber optic cable that is pre-spooled on a cable cartridge 20-1, by programmatically unspooling the cable from the cable cartridge and paying the cable out along a potentially transverse oscillatory path (e.g. sinusoidal curve) of fiber 12 as the robot 19 moves down a cable tray network comprised of a plurality of straight track segments 26-1, 26-2 etc. and a plurality of switchable intersecting track segments 23-1 and 23-2 that are arranged adjacent and above large numbers of equipment bays 10. The cable-dispensing robot 19 is preferably powered by a battery 16 that is periodically charged by docking with a charging system 38 and communicates wirelessly via a wireless module 40 with a controller 36. The controller 36 accesses a database 34 which stores the state of all cables within the cable tray network, including their start and stop locations, cable lengths and potentially manufacturing data (insertion loss, serial number, lot number, etc.). The database 34 further stores information regarding the availability of cable cartridges 20 of standard cable lengths, potentially stored within a cable cassette loading/unloading system, and raises an alert indicating the need to replenish certain pre-determined, standard cable lengths based on automatic inventory tracking. The controller 36 includes a user interface or programming interface that allows it to receive instructions on where and how to spatially deploy a fiber optic interconnect cable within the tray network of a data center facility.

Figure 2:
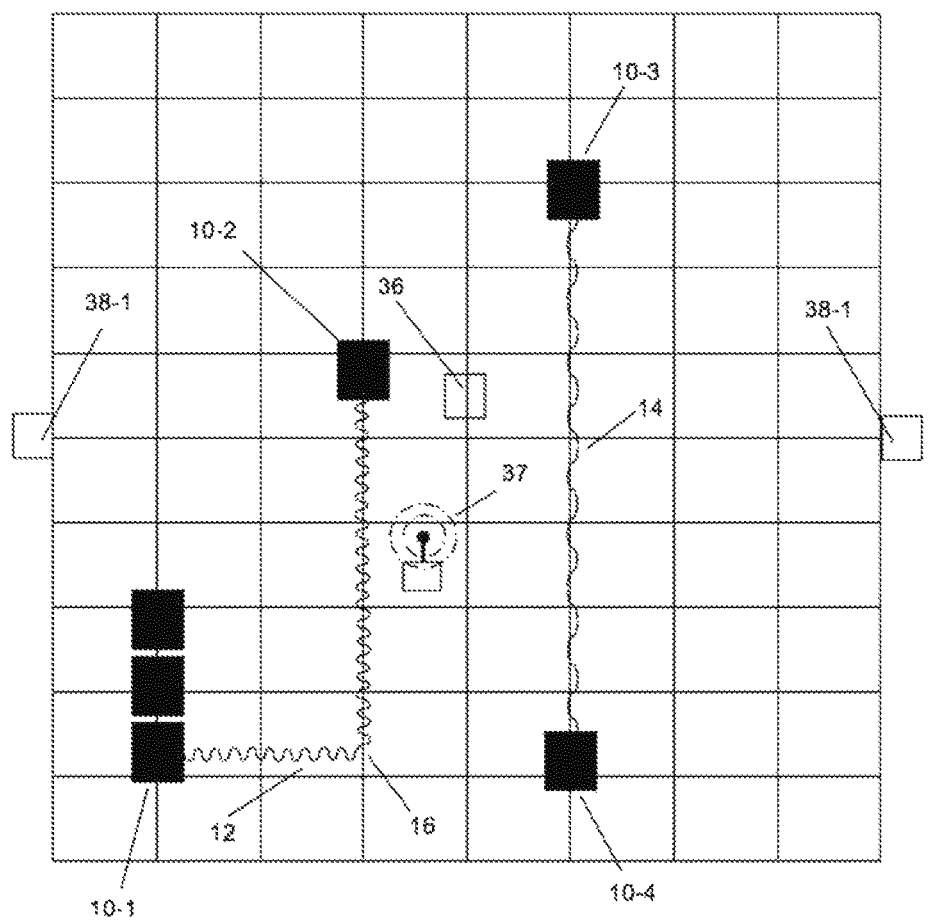
FIG. 2 illustrates the configuration of two example cables directly connecting equipment in different bays, wherein cables are installed at bases of the cable trays with a programmed transverse oscillation with programmable spatial period to take up the needed slack resulting from the difference between the actual distance between bays and the predetermined, fixed, standardized selection of cable lengths installed by a cable dispensing robot.

As illustrated in FIG. 2, the system of interconnected, potentially oscillatory cable paths (12, 14) resides above (or in some cases below) the equipment racks and the nominal location of cables follows a substantially rectilinear grid parallel to the array of network equipment cabinets 10. The locations of the wireless transmitter 37, controller 36, charging stations 38, and equipment bays 10 are shown by way of example in this figure. The fiber optic cable path 12 with first spatial period and path 14 with second spatial period follow an oscillatory pattern, wherein the spatial period of the oscillation is computed based on the excess cable length to be managed and the preexisting, locally varying density of cables along the tray system. The shortest path-length between two network device ports requiring a connection is equal to the nearest available length of fiber cable cartridge 20 that is greater than the shortest path length and that does not cause the local cable density in the tray to exceed the rated limits.

Figure 3:
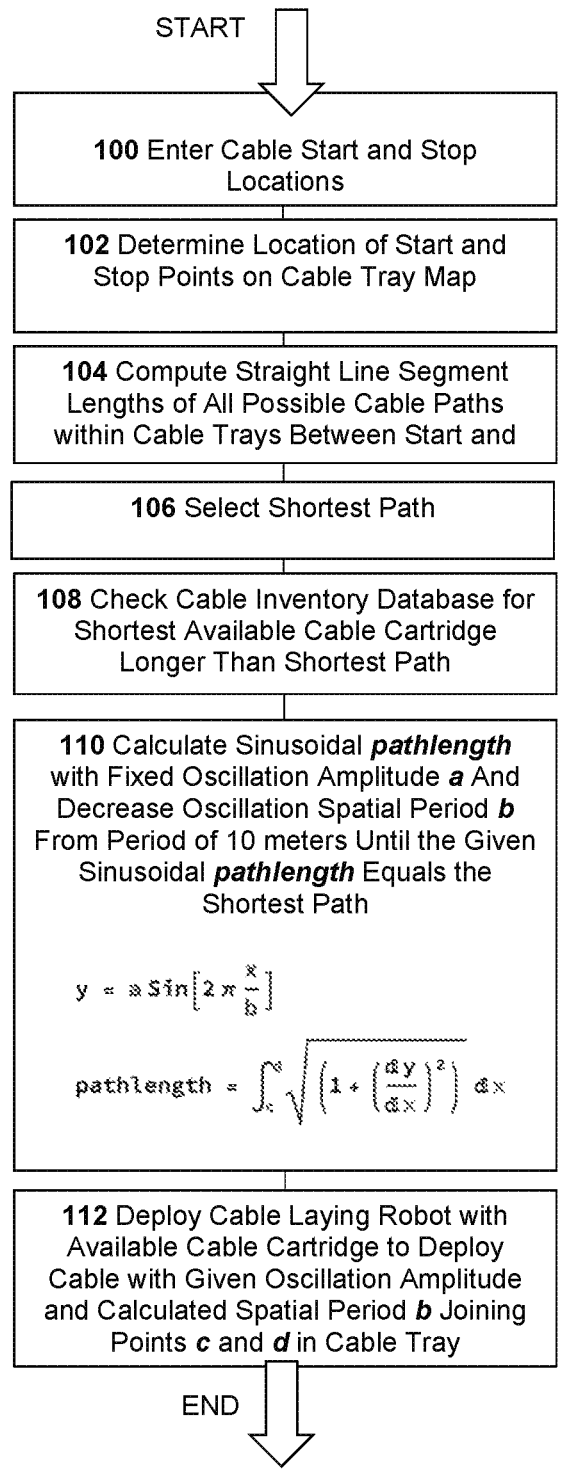
FIG. 3 is a flow diagram of the algorithm used to determine the oscillatory path length of a dispensed cable within a cable tray segment, based upon input parameters.

In accordance with the preferred embodiment of the invention, FIG. 3 is a flow diagram of the algorithm used to compute the optimal physical path of each fiber interconnection within the fixed cable tray network. The goal of the algorithm is to distribute the excess cable length uniformly within the cable tray system to avoid clustering or bunching of cables at certain locations, which is a common concern when large numbers of cables are manually installed with all the slack bunched in the vicinity of one or both cable endpoints. The algorithm further tries to avoid local spots in the cable tray system for which the cable fill factor is approaching 100%.

The first step in the routing process is to enter the start and stop locations of the cable as required to connect a pair of network devices at step 100 and determine the location of start and stop points on cable tray map at step 102. This may be performed by an operator, engineer, or programmatically by reading in, for example, a spreadsheet with required connections and physical coordinates for each connection. The next step 104 is to compute the shortest possible cable length between the two endpoints by following straight-line paths along the rectilinear array of cable trays/tracks. This calculation includes the determination of the density of pre-existing cables within the tray system and the identification of any cable clusters that may be clogging or overfilling the tray system. Once this cable length is determined at step 106, the system checks the inventory of available cable cartridges in different lengths at step 108 and selects the shortest available cable length that is longer than the computed shortest possible cable length. The difference between the two lengths is what determines the period and potentially the amplitude of the oscillatory path. The cartridge can be loaded manually or automatically by cassette loader 41.

In a particular implementation of the algorithm as shown in FIG. 3, the oscillatory path y(x) is described by one or more sinusoidally varying segments characterized mathematically and physically by an amplitude of oscillation a and spatial period of oscillation b. The oscillatory path length is computed at step 110, for example, with amplitude of 25 cm while the period of oscillation is decreased from 10 meters to 1 cm. This selection for amplitude translates into a cable tray with an inside width of at least 50 cm.

The path length calculation in step 110 is typically iterative and based on numerical integration and differentiation of the cable path function y(x), as shown in FIG. 3. As the period of oscillation is decreased to make oscillations more frequent, the path length of the oscillatory path between endpoint locations c and d increases significantly, thereby taking up any excess slack cable length. The local period of oscillation is calculated by setting the corresponding path-length with oscillations equal to the cable length of the available cable cartridge. The next step is to load the selected cable cartridge into the dispensing robot, by manual or automatic means. The cable is then deployed in the cable tray system at step 112, wherein the system lays out the cable according to the calculated oscillatory path.

Figure 4A:
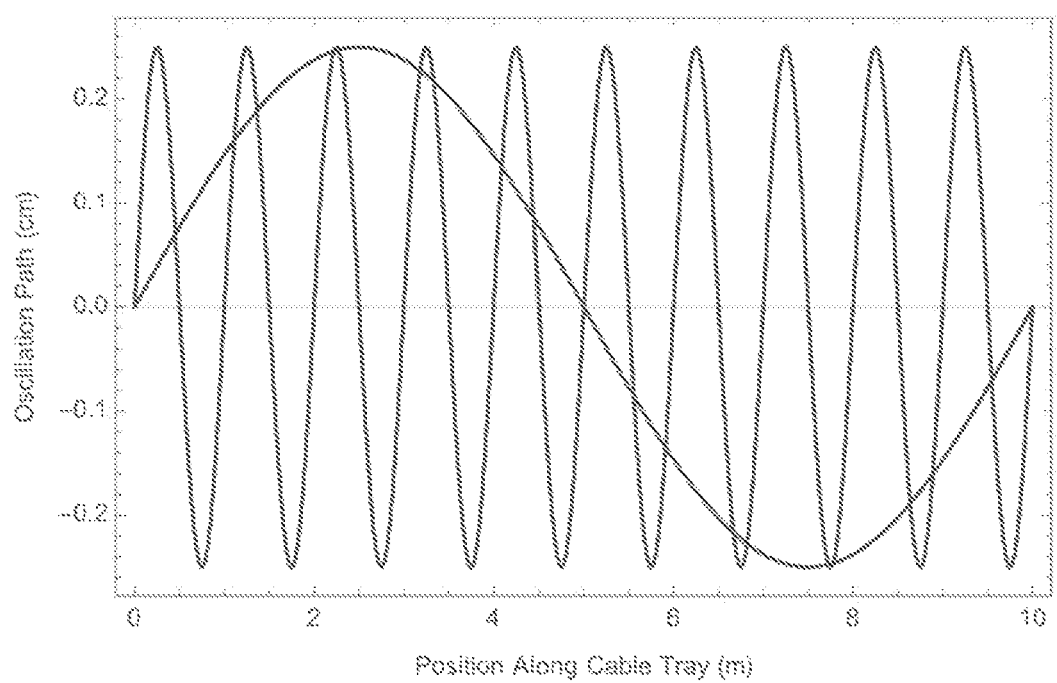
FIG. 4A is a graph illustrating an example of the oscillatory path of a cable within a cable tray for two different spatial periods as dictated by slack take-up length requirements.

FIG. 4A is an example graph of a sinusoidal oscillatory path segment with substantially constant 25 cm amplitude a and a variable spatial period b, the period being set to produce the desired path-length. Note that the rapidly oscillating path displays a significantly longer path-length within a given length of cable tray than the slowly oscillating path. The sinusoidal path versus a square wave is desirable because it subjects the fiber optic cable to minimal bending stress where it turns around. In this regard, the optimal path is a slight variation of a sinusoid, in which the path consists of rectangular segments with substantially rounded corners, as shown in the dotted line in FIG. 4A. The radius of rounded corners is selected based on the minimum acceptable bend radius for that particular fiber. The minimum acceptable radius (while maintaining low optical insertion loss and low bending stress in glass fiber) varies from >25 mm down to <5 mm.

Figure 4B:
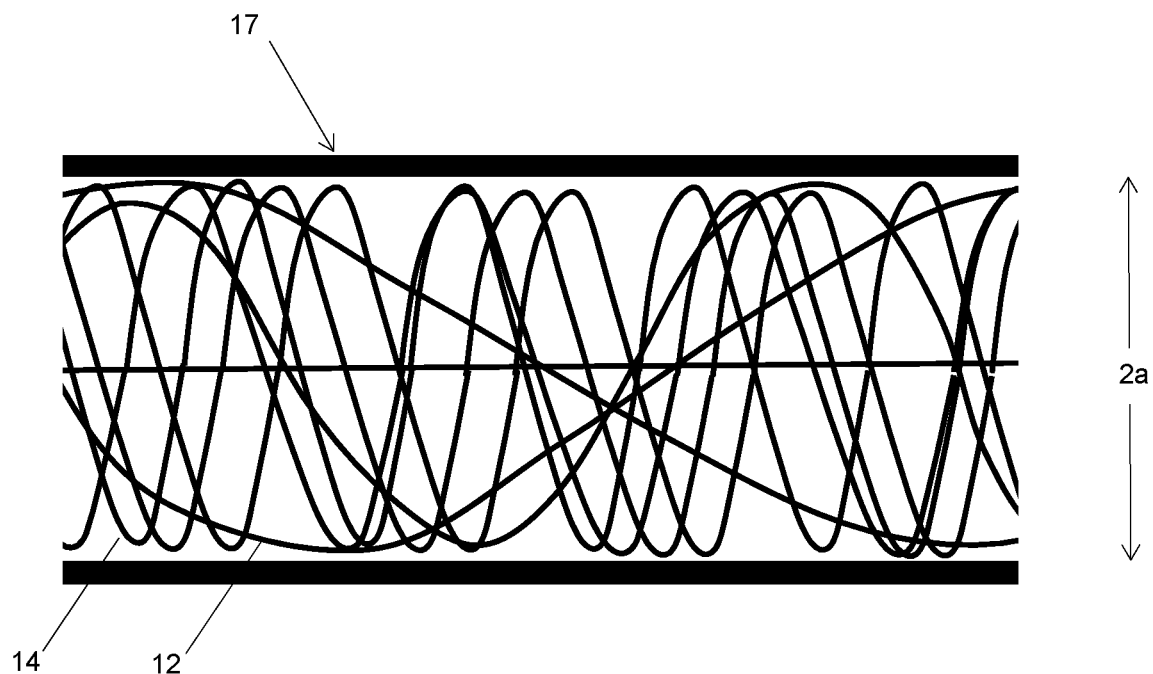
FIG. 4B is a top view illustrating the cables within the cable tray.
Figure 4C:
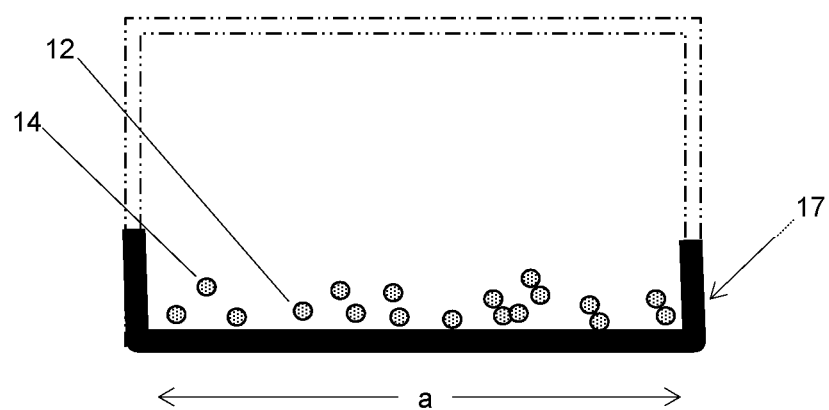
FIG. 4C is a cross-sectional view of the cables within the cable tray.
Figure 4D:
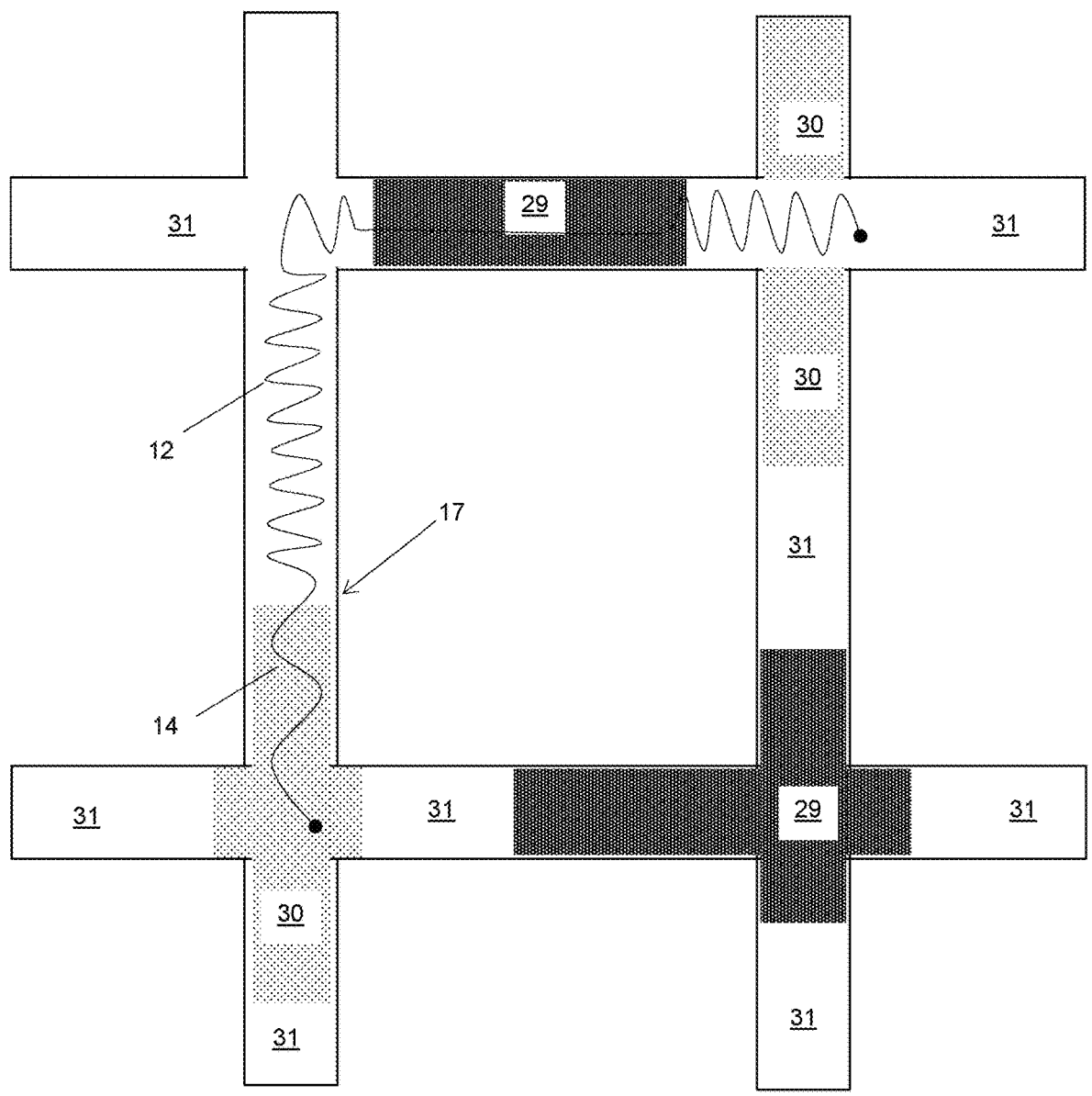
FIG. 4D depicts an example of variable cable density within a cable tray network, and the corresponding path of a particular cable to distribute slack cable selectively in lower density regions to achieve improved balance of cable density throughout.

FIGS. 4B and 4C illustrate a top view and a cross-sectional view, respectively, of multiple independent cables with different periods of oscillation, laid upon one another within a straight segment of the cable tray. FIG. 4D illustrates an extended cable tray network 17 with localized high cable density 29, medium cable density 30, and low cable density 31 regions. The local period of oscillation of each cable laid therein varies based upon the local cable density. The distribution of pre-existing cable density is entered into the cable calculation process (step 110) of flow chart (FIG. 3). For example, the cable segment 12 exhibits a short oscillation period within the low-density region 31 and the cable segment 14 exhibits a longer oscillation period within the medium cable density regions 30 to tend to even out the fill factor. In the high-density regions 29, the cable period of oscillation is very long or infinite (no oscillation), so that a minimal volume of cable is dispensed in this already full region 29. As was shown in FIGS. 4B and 4C, there are potentially thousands of fibers 12-1 . . . 12-N that fill this tray, each with their own unique oscillation paths. Depending on the number of cables and their oscillation paths, there is in general a variation in the local cable density or fill factor along the cable tray network. In accordance with this invention, it is preferred that subsequent cables laid therein are dispensed with a trajectory that reduces the variation in the cable tray fill factor along its length.

Figure 5:
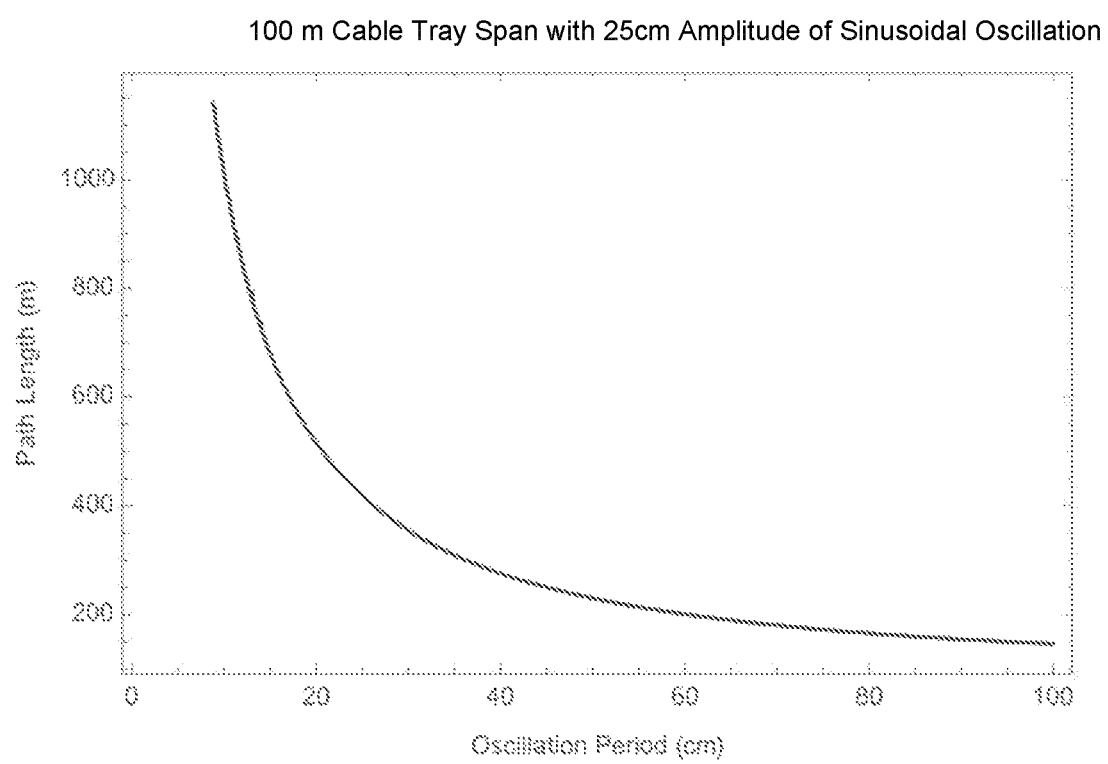
FIG. 5 is a graph of the path length as a function of oscillation period of a cable which illustrates calculation of the path length of the oscillatory path for a fixed 25 cm oscillation amplitude and with a programmable spatial period varying from 10 cm to 100 cm in this example.

FIG. 5 is a graph illustrating path length as a function of oscillation period of the oscillatory path for a fixed 25-cm oscillation amplitude a and with a programmable spatial period b varying from 10-cm to 100-cm for an individual installed fiber cable path within the cable tray. This path length calculation is based on a specific example: a 100-meter long cable tray with 25-cm transverse oscillation amplitude. The horizontal axis in FIG. 5 is the spatial period of oscillation in cm, and the vertical axis is the path-length in meters of the oscillatory path as a function of the spatial period. It can be seen that the amount of slack cable distributed along the 100-m length is significant. For example, an oscillation period of 10-m maintains the path length at only slightly more than 100-m, the straight-line length of the cable tray segment. However, by reducing the spatial period to 100-cm, the path length increases to 150-m. By decreasing the spatial period further to 20-cm, the path length increases to nearly 500-m. Therefore, this oscillatory approach is very effective at managing and distributing slack cable within the cable tray system.

Figure 6A:
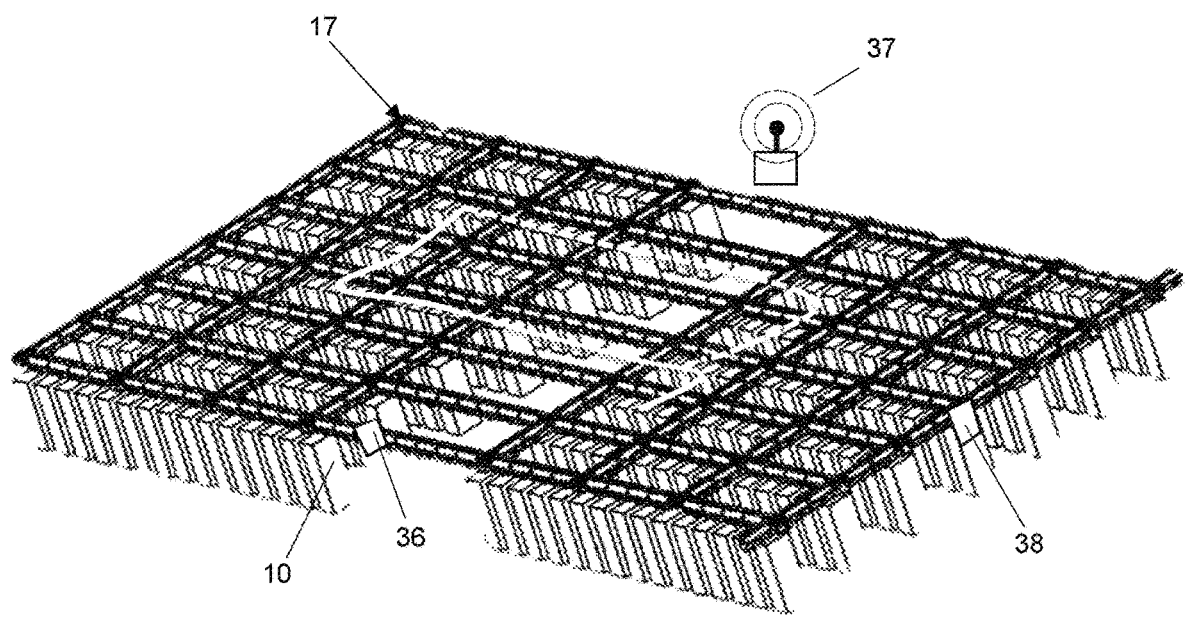
FIG. 6A illustrates an example data center in top view, illustrating the 2D grid of support wires, cable trays, and underlying equipment racks with network interface ports.
Figure 6B:
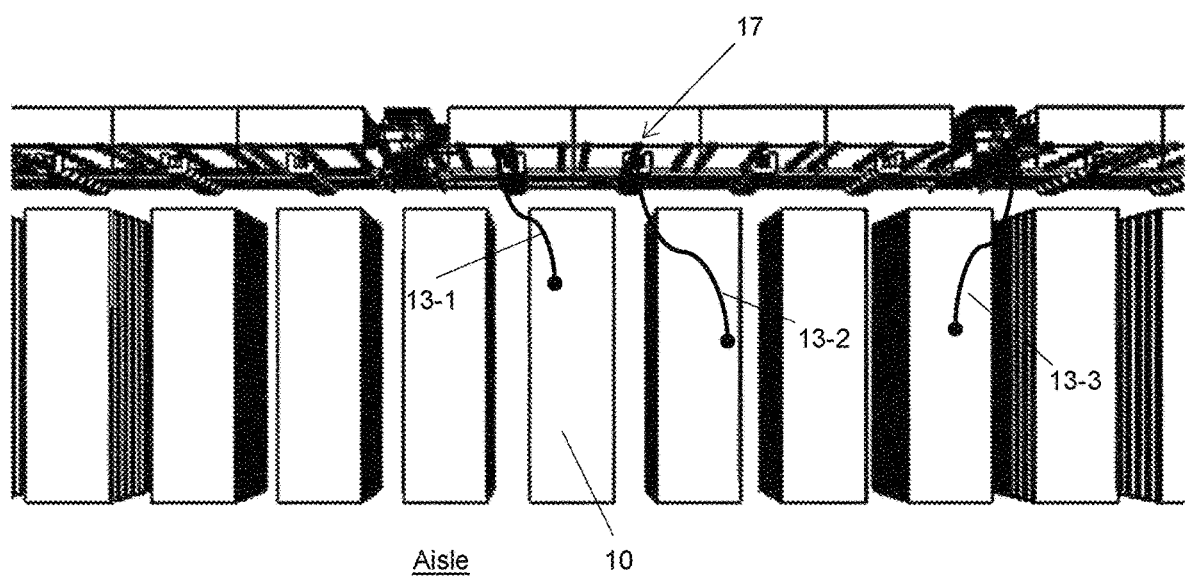
FIG. 6B is a perspective view along an aisle of a data center, with the cable tray network spanning the area above the network and computer equipment being served by an overhead cabling system.
Figure 7:
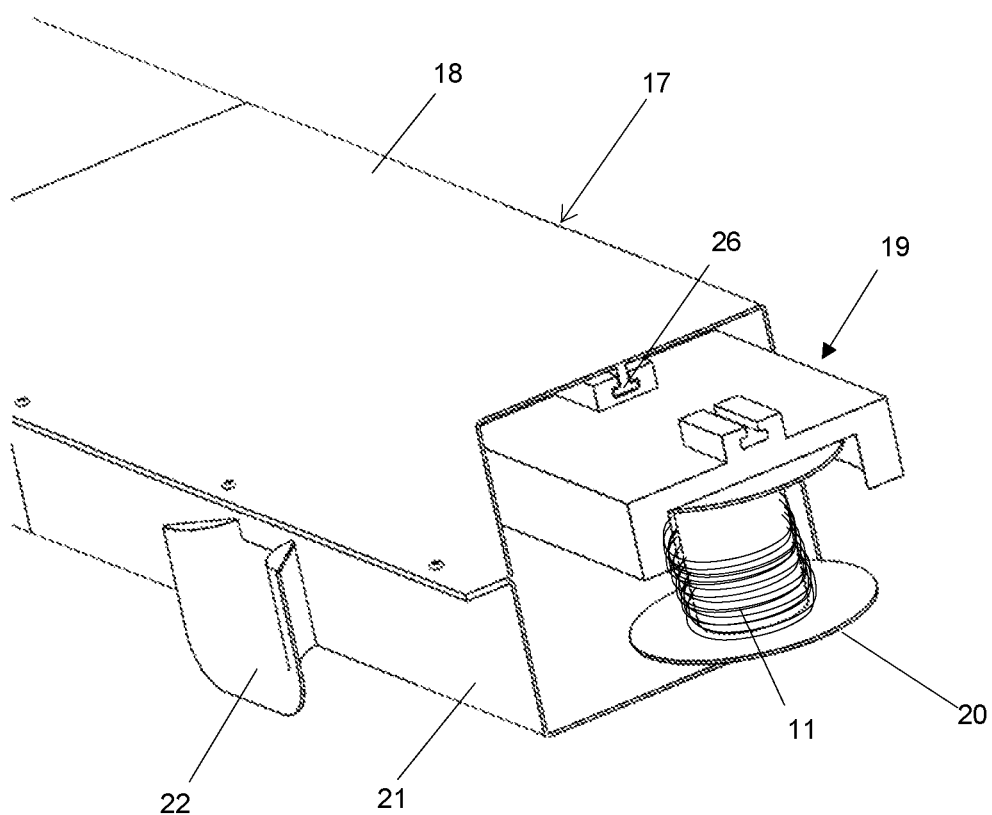
FIG. 7 illustrates an example pay-out spool and robotic shuttle (robot) within a partially cutaway of a cable tray, the cable tray including integral track which guides the robot.

FIG. 6A illustrates a rectilinear cable tray/track system 17 installed above and parallel to aisles of the equipment bays 10 within a data center. At certain locations along a grid of interlocking cable tray segments 26, one or more of the charging stations 38 are disposed to charge the robot battery (not shown) in between reconfigurations. The robot communication to the server 36 is via a wireless connection, so a wireless signal distribution antenna 37 with sufficient range is required in proximity to the track segments. As illustrated in the side view of FIG. 6B, cable tray systems 17 are typically elevated and run above the tops of the equipment racks 10. Technicians must use ladders to access trays and run cables therein, which is a time consuming, labor-intensive process. While there are situations where the cable trays may be disposed below the floor, as in raised floor facilities, this is less common. Typically, these floors are raised 0.5 to 1-m above the subfloor. Fiber optic cables within these trays takes several forms, including individual duplex or simplex cables with 0.9-mm, 1.6-mm, 2.0-mm or 3.0-mm outer diameters. Moreover, larger diameter structured cabling with outer diameters ranging from 3-mm to 10-mm and fiber counts of 12 to 96 per jacket may be used up to limits in diameter of fiber bundle that can be dispensed. Cable tray systems can be complex, including two tiers of cable trays at different heights, with each tray being utilized for a different type of cable (e.g. optical fiber vs. copper).

As detailed in FIGS. 7-10, the cable tray system 17 includes a bottom cable tray section 21 and further incorporates an upper track system 26 integral with a tray cover 18 to support and guide the cable dispensing robot 19. The cable dispensing robot 19 accepts a standard patchcord cartridge 20 and then travels down the track system autonomously with the intelligence to optimally dispense/route cable to minimize clustering of the cables within the trays and to automatically manage excess cable lengths.

Fiber optic cables with protective jackets and KEVLAR strength reinforcement are typically 1.6 to 3.0-mm in diameter. This structure is required to protect the internal optical fiber during manual installation into trays. This manual process involves pulling the cable, which would otherwise damage cables if they did not have protective jackets and KEVLAR strength reinforcement. The added size and mass of the cable is significant and limits the cable density within the cable tray.

In accordance with this invention, the use of an automated, robotic deployment system in which the cable locations are all known and deterministic and the cables are not subjected to pulling forces allows for a much more compact, lightweight and less costly construction. Bend insensitive optical fiber (e.g. Corning CLEARCURVE ZBL, single mode and multimode) can be deployed in its miniature, unjacketed form or in a compact, multi-fiber ribbonized form. The fiber diameter of a tight buffered or loose tube optical fiber is typically only 0.5 to 0.9-mm in diameter. This significantly increases the density achievable within the cable tray system by a factor of ten or more. For duplex connections, deployable fiber cassettes in accordance with this invention would include two fibers that are deployed substantially parallel to one another. In the preferred embodiment, this miniature fiber 11 is spooled on the cable cartridges 20 in FIG. 7 and is ready for deployment.

In a further example, it is advantageous to utilize reduced cladding optical fiber with an 80-micron outer diameter and a 165-micron acrylate coating outer diameter. This allows 12 fibers to be arranged within a 1-mm OD jacket diameter. This use of multiple fibers within a compact jacket allows for further increase in density within the cable tray system. The small outer diameter facilitates spooling and deployment by the cabling robot 19.

Figure 8:
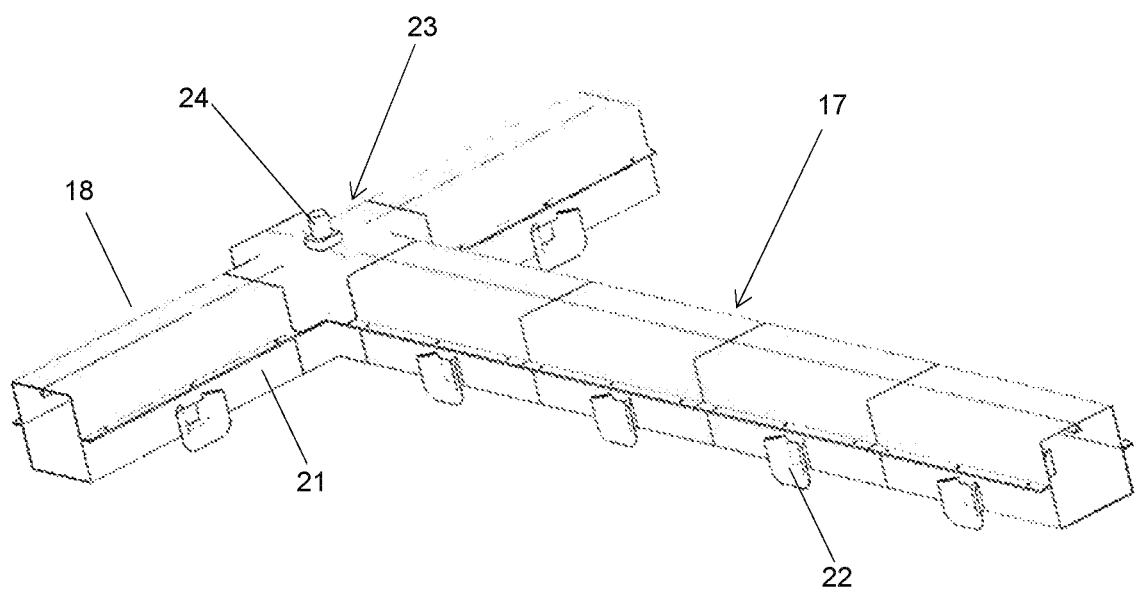
FIG. 8 illustrates a portion of the modular, interlocking cable tray system with a programmable, switchable crossing point controlled through a communication interface and spaced apart cable ingress and egress points with waterfall bend management features.

In accordance with this invention, the cable tray system as illustrated in FIG. 8 consists of multiple interlocking cable tray segments typically constructed of injection molded plastic or metal wire mesh tray segments with suitable hardware to suspend from a ceiling or mount to the top of the racks and/or enclosures. Cable trays include a bottom section 21 or trough for storage of cables and an upper section 18 forming a top cover. This top cover must have an integral track structure. Cable tray sections further include outlet ports 22 from which cables exit the tray and connect to equipment thereunder. The cable trays 17 built up of interlocking cable tray segments 26 may intersect at right angles, and at the switch segments 23 an actuator element 24 is provided to turn/redirect the cable dispensing robot 19 along a different substantially straight line path as required.

Figure 9:
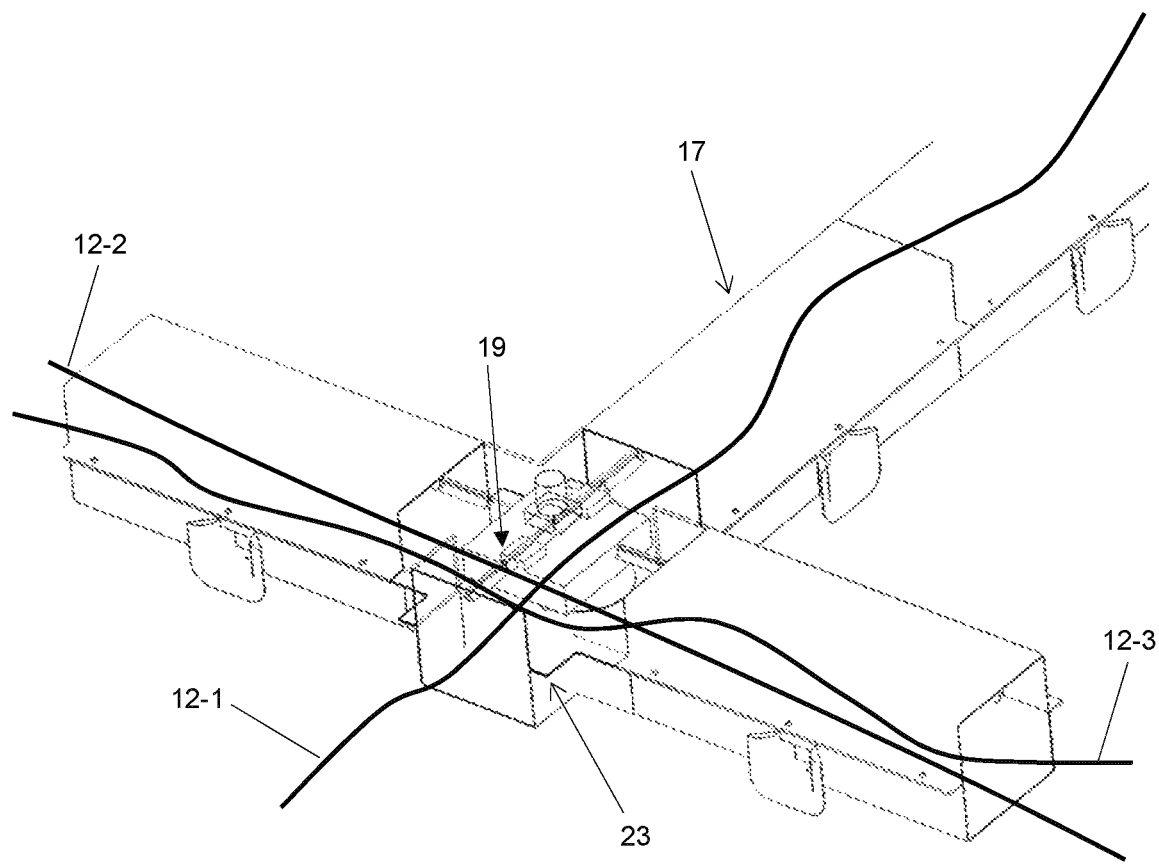
FIG. 9 illustrates the cable crossing point with a robot at a rotating switch crossing section.
Figure 10:
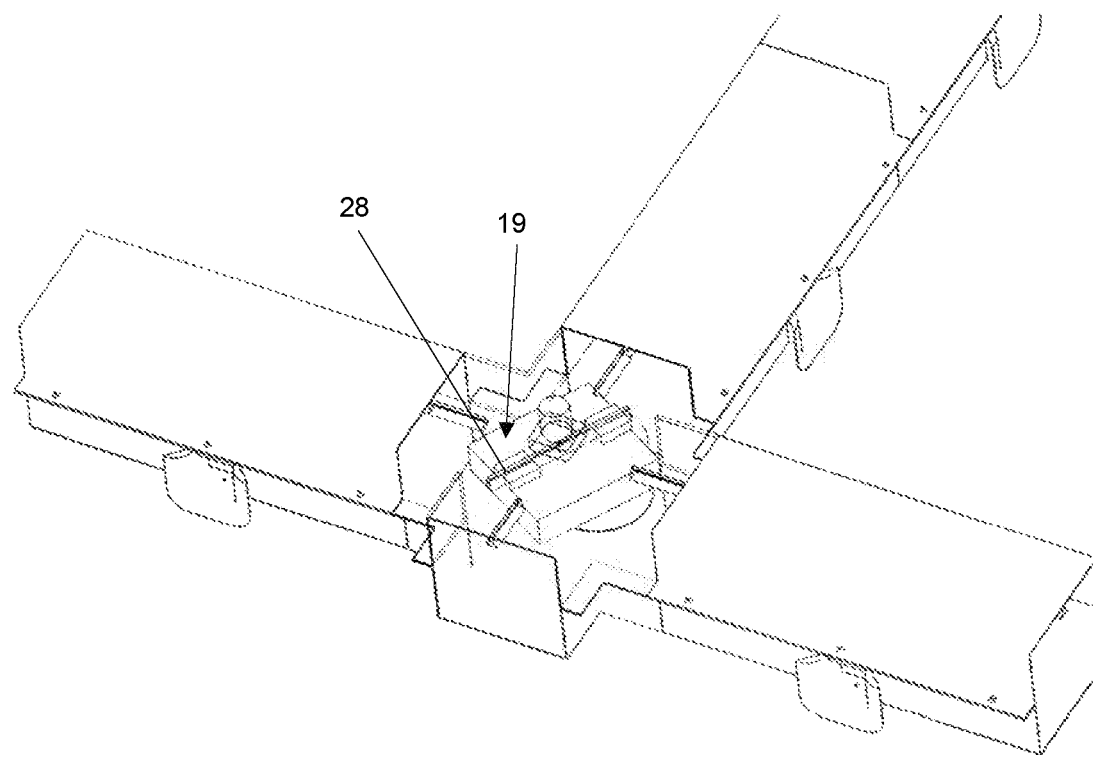
FIG. 10 illustrates the cable crossing point with switch section rotated by 45-degrees.

In addition, at cable tray crossing points as illustrated in FIGS. 9 and 10, the robot 19 may need to do a 90-degree turn. For this reason, switchable and motorized cable tray crossing-points are needed to rotate and redirect the robot 19 once it is positioned on a switchable track element 28. In situations where several cables are being installed simultaneously on the same shared track layout, algorithmic and sensing means to prevent physical collisions are needed. FIG. 9 illustrates the cable tray system with two cables 12-1 and 12-3 disposed therein. Cables will typically cross over one another at intersection points in the switch segments 23.

Figure 11:
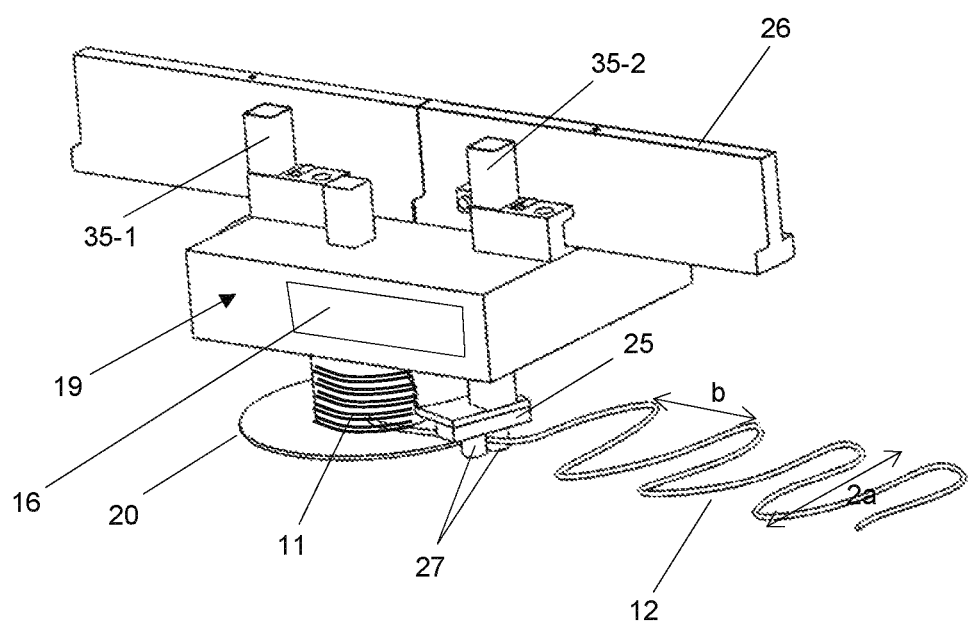
FIG. 11 illustrates the oscillatory path in which cable is laid in a tray, with the pattern of the cable path having an amplitude a and spatial period b that are predetermined to take up a pre-programmed amount of slack cable.
Figure 15:
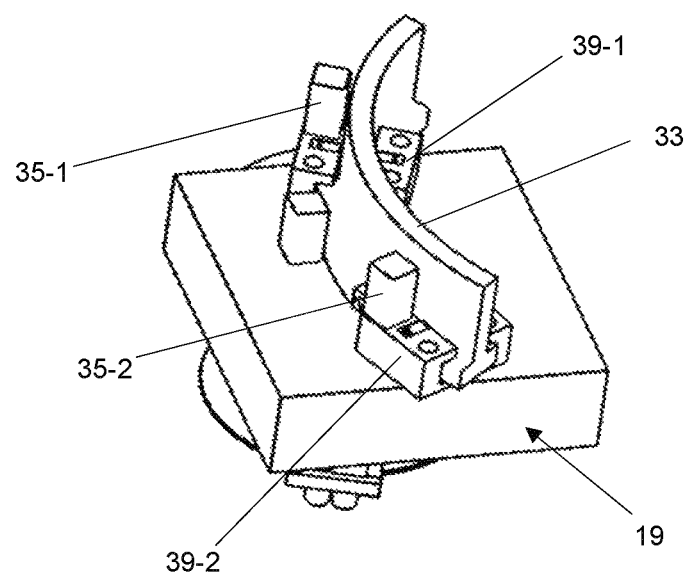
FIG. 15 is a top cutaway view of robot maneuvering around a right angle curved section of a cable tray.
Figure 16:
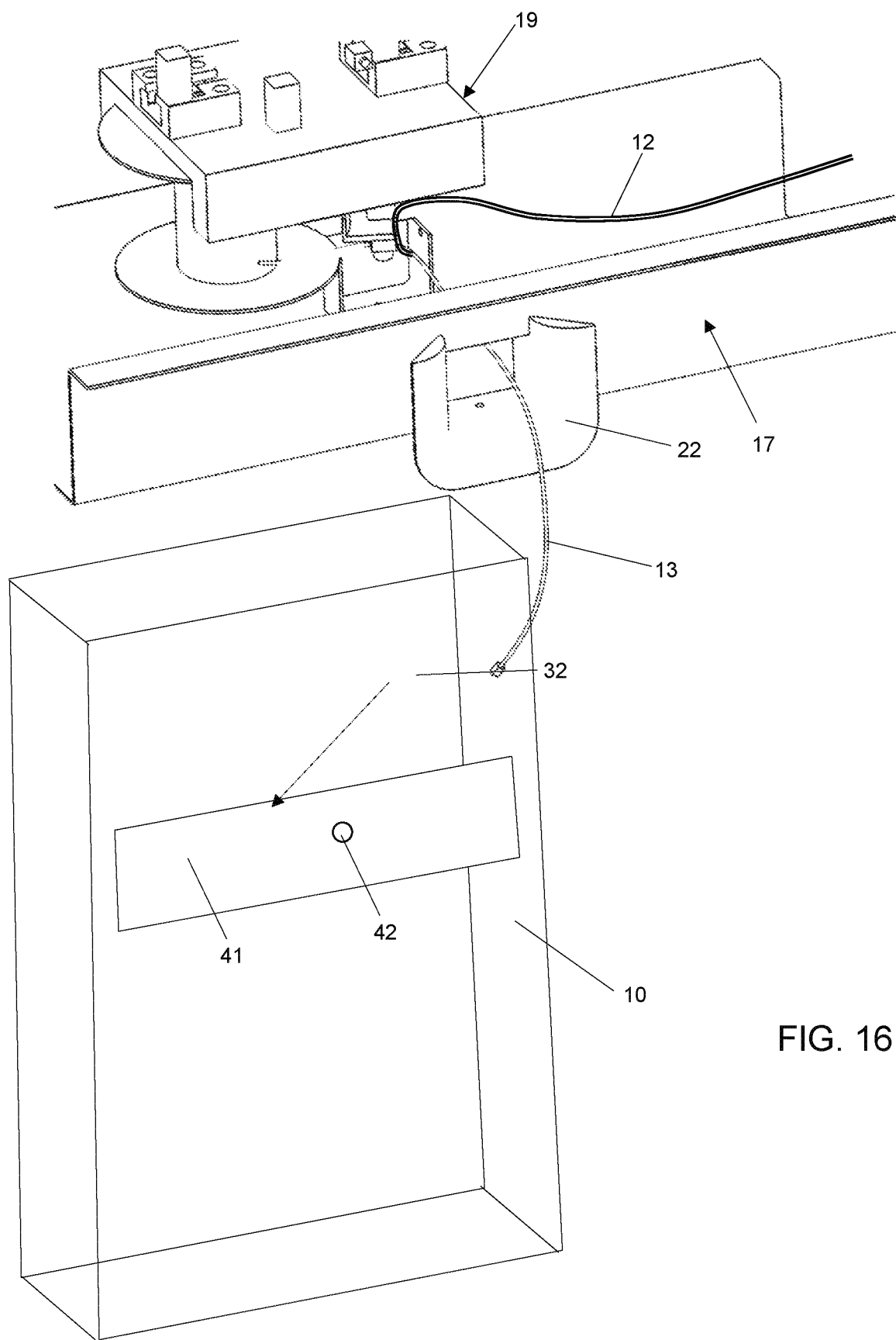
FIG. 16 illustrates a fiber optic cable exiting the cable tray system to an equipment bay thereunder.

FIG. 11 illustrates a reciprocating arm 25 of cable dispensing robot 19 suspended from track segment 26, wherein the arm with feed rollers 27 is used to deploy the cable 11 from the spool 20 to the cable tray (not shown here for clarity) in the shape of the oscillatory path 12 with period b and amplitude a. The robot 19 further includes first and second drive motors 35-1, 35-2 that transport the robot 19 down curved track section 33, as shown in FIG. 15. Power is supplied by internal battery 16. Once the robot 19 reaches the destination point (FIG. 16), the reciprocating arm 25 moves to the outlet port 22 and feeds the remaining cable 12 and its connectorized end 32 off of the spool 20, so that the cable's connector 32 drops out of cable tray port 22 and a drop down cable segment 13 of cable 12 has sufficient length to reach the corresponding port 42 of a network device 41 within the rack 10 below.

Figure 12:
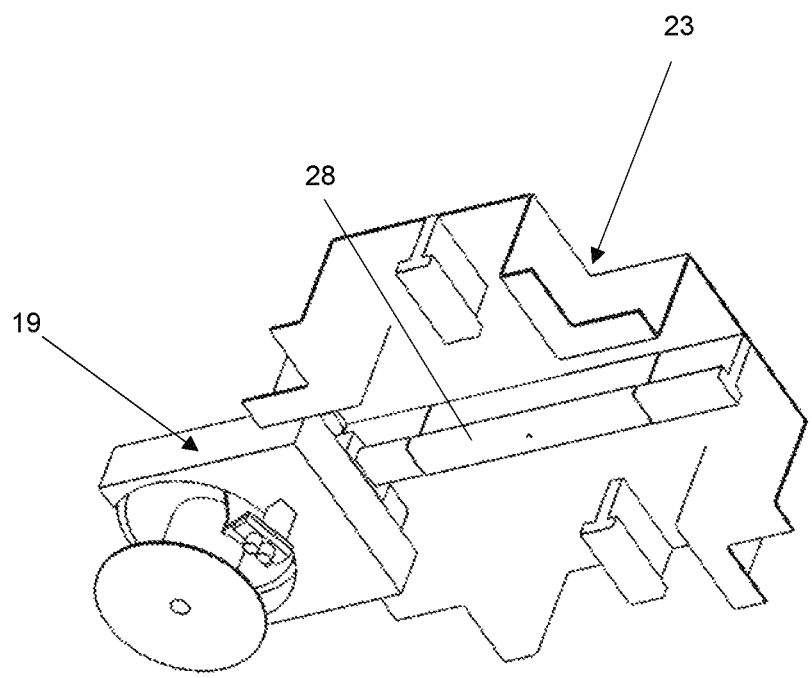
FIG. 12 is a bottom cutaway view of a robot upon entry to a tray crossing point.
Figure 13:
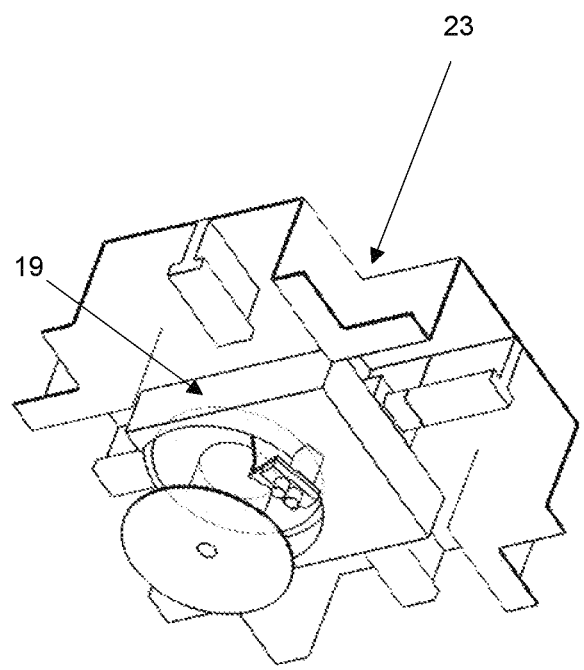
FIG. 13 is a bottom cutaway view of a robot at a motorized tray crossing point.
Figure 14:
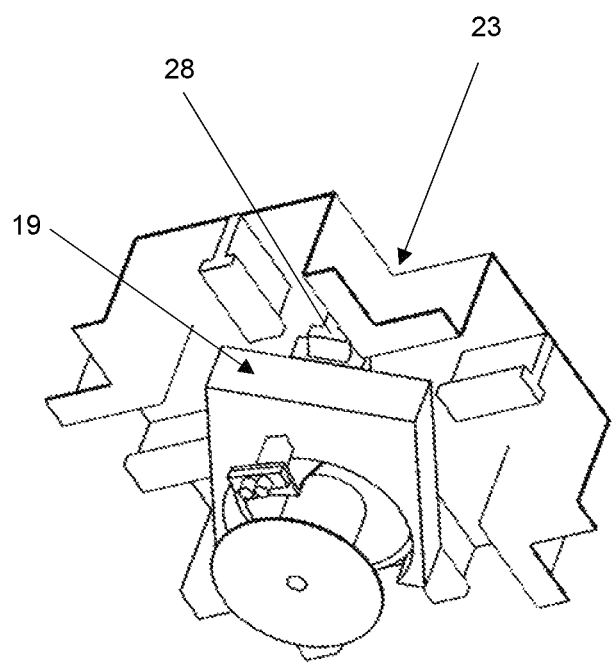
FIG. 14 is a bottom cutaway view of a robot while rotating along a motorized tray crossing point to make a change in direction.

FIGS. 12-14 detail the robot 19 as it travels through an intersection or crossing-point segment 23, in which a switchable track segment 28 allows the dispensing robot 19 to change direction while deploying the cable. The cable can then be routed through a 90 or 180-degree angle through the switch section.

In summary in a particular example, the autonomous cabling system comprises the following elements:
1. A network of fiber optic cable trays 17 situated above the racks 10 of a data center;
2. Cable tray covers 18 with integrated robotic dispenser guidance track 26;
3. Crossing sections with switchable robot track segment 28;
4. One or more robotic cable dispensers 19 that move along track;
5. Fiber cable routing algorithm to connect any two ports based on three-dimensional coordinates of ports being connected with an oscillatory path to accommodate slack cable length;
6. A further algorithm to enable multiple robotic dispensers 19 to operate concurrently within the same cable tray network;
7. Robotic dispensers including a reciprocating fiber payout means 25;
8. Robot track segments having radiused ingress and egress ports 22 oriented normal to longitudinal axis of track to allow fiber optic cables to drop down out of trays so they can be routed down side of equipment rack and terminated on network equipment port;
9. Central management server 36 coordinating movement of one or more robotic dispensers 19 and preventing collisions while optimizing paths taken; and
10. Docking charge station(s) 38 distributed along cable tray system for charging of robotic dispenser.

In a further example, the robotic dispenser includes the following features in addition to those set forth above:
1. Pivoting, wheeled truck assemblies 39 with traction wheels and motorized propulsion means 35 for engagement onto track integral to cable tray;
2. RFID reader to read identity of cable;
3. Machine vision subsystem with built-in lighting;
4. Rechargeable battery to power dispenser; and
5. Wireless communications module 40 to communicate with server 36.

In a further example, the robotic cable dispenser 19 or shuttle carries one or more small diameter fiber optic cables pre-wound on a spool 20. A technician selects and installs a pre-loaded spool with correct cable length into the dispenser at a starting point. The spool is configured to allow the dispenser to pay out cable by rotating the spool in coordination with its travel down the cable tray system 17. Both ends of cable on spool may further include a unique label, barcode or RFID identifier in the vicinity of the connector that is automatically entered into the management system at the time of installation. The shuttle travels on guide tracks 26 laid out parallel and/or perpendicular to the aisles. Preferably the shuttle is controlled wirelessly and is battery powered. The fiber optic tray system 17 is arranged in a rectangular grid and the trays define the paths over which the cables may be routed. Routing is based on computation of the optimal path based on current fill state of cable tray system so that congestion of the cable tray at any particular location is avoided. Cabling system's software engine residing on management server 36 performs the routing calculation.

In a further example, the fiber optic connectors 32 at both ends of each cable 12 include an RFID reader and/or barcode. The shuttle includes an RFID reader and/or a camera scanning system to read the barcodes. The shuttle pays-out fiber from a spool cartridge 20. The load produced by the fiber optic cable is relatively low and the suspended shuttle can be relatively small, compact and inexpensive.

In certain instances, this interconnect architecture and system reduces the need for intermediate distribution frames and main distribution frames (IDFs and MDFs, respectively). Programmable, direct fiber optic cable connections 12, 14 can be made between all equipment bays. This allows for significant space and cost reduction. One robot or shuttle 19 can replace all the distribution frames and technicians normally deployed in the data center.

The optimal path to route each cable 12 along the cable tray grid is selected by a network management controller, based on the three-dimensional locations of cable endpoints and on available lengths of the cable provided in spool form and loaded into the cable dispensing robot 19. An algorithm is used by controller to automatically manage and distribute the slack cable within the cable track so that the cable installation is highly organized. For example, the spatial period and amplitude of repeated transverse oscillation pattern of cable is computed by the control system to uniformly distribute slack along the cable tray and reduce excessive bunching and overfilling at certain locations along the tray.

In accordance with the invention, the system for automated data center cabling installation thus includes the following key elements of the system:
1. Overhead fiber optic cable trays 17 with integral guiding track 26 on which self powered dispensing robot travels;
2. Wheeled cable dispensing robot 19 that lays small diameter simplex, duplex or micro-distribution fiber 12 for maximum density within a cable tray;
3. Cable laying robot is able to navigate right angle turns and/or switches 23;
4. Management system and algorithm residing on server 36 that automatically computes cable path (e.g. 12, 14) in trays based on desired endpoints of cable, wherein software management and control system calculates transverse wiggle amplitude and period of cable. This accommodates slack of a given prepared and connectorized cable length while laying the cable between different racks as shown in FIG. 6.

In a further example of this invention, the cable-laying robot can also remove a specific cable from the cable tray by re-spooling it into the cable-laying robot. This cable can potentially be re-used. Alternatively, connectors may be removed and the cable may be cut into substantially straight sub-sections, with the cuts located at positions along the cable trays where the cable undergoes a change of direction, say by 90-degrees or 180-degrees. These cable sub-sections can then be removed by re-spooling it into the cable-laying robot.

In a further example of this invention, a segment of track network 17 may extend into a cable cassette loading/unloading system 41, said loading/unloading system including actuation means to select and present a particular cassette 20 with length of cable 11 to the cable dispensing robot 19 so that further actuation installs a new cassette 20 into robot 19. Moreover, the loading/unloading system 41 may also include actuation means to remove spool of cassette 20 once the cable 11 is fully dispensed.

Those skilled in the art will readily observe that numerous modifications and alterations of the device may be made while retaining the teachings of the invention. Accordingly, the above disclosure should be construed as limited only by the metes and bounds of the appended claims.

The invention claimed is:
1. A fiber optic cable installation robot system for installation of a multiplicity of fiber optic cables between first and second spaced-apart equipment racks within a facility and directed by a controller on which a cable deployment algorithm resides, said system comprising:
 a cable tray and track network positioned above and substantially in alignment with rows of equipment racks, the cable tray and track network having a bottom cable receiving section with periodically spaced cable outlet ports, a top track guidance section, and a plurality of track switch sections at locations wherein said tracks cross; and
 one or more cable dispensing robots for individually dispensing a pre-spooled fiber optical cable along a transverse oscillatory path determined by said cable deployment algorithm in the bottom cable receiving section, wherein said path has a programmable spatial period determined by said cable deployment algorithm, and
 said cable dispensing robots including a motorized upper track engagement element, a drive element, a reciprocating cable feed element, a wireless communication element, and a power element.

2. A system in accordance with claim 1, wherein said transverse oscillatory path is selected such that an excess length of said cable is distributed within and along the length of the cable receiving section, wherein the excess length of said cable is based on the length of the pre-spooled fiber optic cable and the minimum path length between a port on the first equipment rack and a port on the second equipment rack.

3. A system in accordance with claim 1, wherein said cable comprises an outer diameter pre-spooled fiber optic patch cord of a given length, said patch cord including fiber optic connectors disposed at first and second ends of the patch cord which plug into receiving ports on the first and second equipment racks,
 wherein the wireless communication element is configured to enable the controller to send and receive appropriate command instructions to and from said robot.

4. A system in accordance with claim 3, wherein the patch cords have an outer diameter of 0.5 mm to 1 mm and include LC connectors at either end.

5. A system in accordance with claim 1, wherein the spaced-apart equipment racks are up to 1,000 meters apart.

6. A system in accordance with claim 1, wherein the cable trays are at least 25 cm wide, 25 cm in height, and extend transversely at least 1 meter to reach a multiplicity of racks.

7. An automated system including a controller with an interconnect placement algorithm for installing an additional fiber optic interconnect between a pair of ports on different network devices; wherein the interconnects lie substantially within a network of suspended cable tray segments and said network of cable trays having multiple potential pathways between said pair of ports; said system comprising:
 the controller tracking and storing locations of pre-existing interconnects within said network of cable trays to ascertain a fill ratio in each tray segment, and wherein the controller is programmed to compute an optimal path to route an additional interconnect between the pair of ports and distribute excess interconnect length and further calculate a minimum length of the interconnect;
 a cable-laying robot constructed and adapted to deploy the interconnect along a transverse oscillatory reciprocating path within a bottom section of the cable tray, a spatial period of the path selected by a cable deployment algorithm to accommodate an excess length of interconnect exceeding said minimum length, thereby distributing excess length of the interconnect along the cable tray segments; and an interconnect cassette receiver constructed and adapted to load the interconnect, packaged initially on a cassette, into the cable-laying robot, wherein the interconnect is selected to have at least said minimum length.

8. A system in accordance with claim 7, wherein the interconnect is laid in said cable tray with a substantially sinusoidal pattern whose amplitude and period are determined by said cable deployment algorithm, residing on said controller, to uniformly distribute the excess length of interconnect along the cable tray.

9. A system in accordance with claim 8, wherein the tray system is sized to support in excess of 1,000 fiber optic interconnects.

10. A system in accordance with claim 9, wherein interconnects are 0.5 to 1.6 mm in diameter, and each interconnect is comprised of 1 to 24 individual optical fibers.

11. A system in accordance with claim 8, wherein the spatial period is 0.5 to 10 meters.

12. A compact cable-laying robot system for use in data centers comprising:
    a motorized drive system to propel the cable-laying robot along an overhead track and cable tray system;
    a wireless communication element;
    a replaceable fiber optic cable cartridge containing a predetermined length of fiber optic cable having first and second ends with connectors at either end;
    a motorized fiber optic reel holder on which the fiber optic cable cartridge resides; and
    a programmable, reciprocating, motorized fiber payout system to lay the cable within a cable tray along a deterministic, oscillatory path determined by a cable deployment algorithm, wherein said path has a programmable spatial period determined by said cable deployment algorithm.

13. The robot of claim 12, further including:
    a battery storage element to power the drive system, payout system and communication element; and
    a battery charging and docking system, integral with the overhead track and cable tray system constructed and adapted to charge the cable laying robot, and monitoring health status of said robot during periods in between installation of said predetermined length of fiber optic cable.

14. The robot in accordance with claim 12, wherein the fiber optic cable cartridge can retain as much as 100 meters of cable.

15. The robot in accordance with claim 12, wherein the fiber optic cable has an outer diameter of 0.5 to 1.6 mm and each cable may be comprised of 1 to 24 individual and independent optical fibers.

16. The robot in accordance with claim 12, further including an integrated RFID or barcode reader to readout an RFID tag whose data includes the length of cable on said cable cartridge.

17. The robot in accordance with claim 13, further including a mechanism constructed and adapted to redirect said connector out of the cable tray to be routed to a mating receptacle on a network element within an equipment bay.

18. An elevated cable tray network installed above and substantially parallel to an array of equipment bays of a computing center and able to support connections between any two devices in the center, comprised of:
    a multiplicity of straight, interlocking cable tray segments with integral track; a multiplicity of interlocking intersection cable tray segments, each segment containing an actuable switch track;
    one or more mobile dispensers of fiber optic cables disposed along the cable tray network; and
    a controller in communication with the one or more mobile dispensers and the actuable switch track, said controller constructed and adapted to compute the shortest physical path between any two devices in said computing center, and further including an algorithm constructed and adapted to compute a spatial period of oscillation of the cable that distributes any slack cable length substantially uniformly along said cable tray network,
    wherein said one or more dispensers individually dispense pre-spooled optical fiber cables along a transverse oscillatory path determined by said algorithm, said path having said spatial period of oscillation as determined by said algorithm.

19. The cable tray network in accordance with claim 18, further including a fiber optic cable on a dispensing cassette that is installable and changeable within said mobile dispenser.

20. The cable tray network in accordance with claim 19, wherein the fiber optic cable includes one to twenty-four single-mode and/or multi-mode optical fiber strands.

21. A system in accordance with claim 1, wherein an excess length of said cable is selected to prevent excess cable density at any particular location along the track.

* * * * *